N. H. HAND.

Improvement in Drills for Channeling Stone.

No. 129,407.  Patented July 16, 1872.

Witnesses  Inventor
Nathan H. Hand 129,407

UNITED STATES PATENT OFFICE.

NATHAN H. HAND, OF PITTSFORD, VERMONT.

IMPROVEMENT IN DRILLS FOR CHANNELING STONE.

Specification forming part of Letters Patent No. 129,407, dated July 16, 1872.

SPECIFICATION.

I, NATHAN H. HAND, of Pittsford, in the county of Rutland and State of Vermont, have invented certain Improvements in Stone-Channeling Drills, of which the following is a description and specification.

Hitherto the drills used in channeling stone have commonly been arranged with several distinct cutters placed side by side, either parallel or inclined to each other, so as to form a gang-drill, and though some attempts have been made to unite several cutters in a single drill, they have hitherto been unsuccessful, owing to the liability of the cutters to break, the unsteadiness of the drill in its channel, and other causes which are familiar to quarrymen.

In my improved drill several teeth or cutters are constructed in one piece, being so united as to form a single drill, the principal peculiarity of which is a web-tooth or cutter which runs longitudinally through others at right angles to it, so as to form a series of cutting-edges united and strengthened by the web which connects them.

Figure 1:
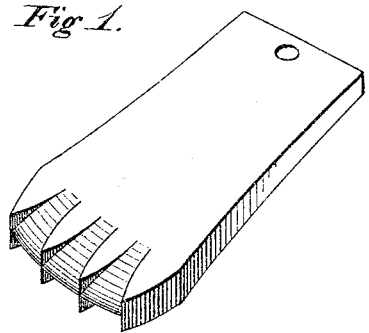
Figure 2:
Figure 3:

In the accompanying drawing, Figure 1 is a perspective view of the drill. Fig. 2 is a plan view of the cutting-edge of the teeth or cutters, and Fig. 3 represents a modification of the same.

The head of the drill, as shown in Figs. 1 and 2, is armed with a series of parallel teeth or cutters, which, as the drill is generally used, are at right angles to the channel, and through the middle of these in the direction of the channel runs the web or longitudinal cutter, which serves to strengthen the others, and also to cut or break down the stone between them. It is important that this should be done, as the irregularities left by the spaces between the parallel cutters might otherwise strain or break them when the drill is moved forward in the channel. It is found best to place the parallel teeth at irregular distances from each other, so that when the drill is advanced in the channel they may be less likely to strike in the same place as before, and the edges of the cutters as generally constructed have a curved or convex form, so that the cut will be deepest in the middle, but neither of these last two features are necessary to the invention, which, as before stated, consists essentially in the use of the longitudinal web-tooth or cutter. The head or face of the drill, which is armed with the cutters, is made somewhat larger than the shank, so that the latter will not touch the sides of the channel. As hitherto used, and as it is intended to use them in the future, the parallel cutters form a right angle with the longitudinal web; but a slight departure from this angle might be given without departing from the spirit of the invention, though this departure must not be large, as it is found that a right-angled tooth has material advantages over an inclined one. The drill may also be modified by the omission of alternate half teeth on each side of the web, as shown in Fig. 3, which is the same in principle as the form first described.

From this description it will be seen that my invention consists in the use of the longitudinal web-tooth or cutter running through the middle of the others in a line parallel to the movement of the drill as generally used, the whole being in one piece, and constituting a single drill, as distinguished from a series of cutters made separately and used as a "gang-drill."

I am aware that drills have been before constructed having several teeth or cutters united to form a single drill, and do not claim this feature broadly, but the peculiar arrangement of the cutters in my drill has advantages which render it a practical channeling drill with a series of teeth, which has long been a desideratum in quarrying stone.

Therefore I claim as my invention—

The improved channeling-drill having a series of two or more parallel teeth at right angles to a longitudinal web-tooth which connects them, the whole being made in one piece.

NATHAN H. HAND.

Witnesses:
J. A. LATHROP,
F. W. DOW.